United States Patent [19]

Aldridge

[11] Patent Number: 4,668,297

[45] Date of Patent: May 26, 1987

[54] LOCKING COMPOUND FOR LOCKING FASTENERS IN PLACE

[75] Inventor: Jimmy A. Aldridge, Inglewood, Calif.

[73] Assignee: Lockheed Corporation, Calabasas, Calif.

[21] Appl. No.: 812,500

[22] Filed: Dec. 23, 1985

[51] Int. Cl.$^4$ ............................ C09D 1/00; C09D 1/02
[52] U.S. Cl. ..................................... 106/286.5; 106/84; 106/287.17; 106/287.34
[58] Field of Search ..................... 106/287.34, 84, 38.3, 106/287.17, 286.5, 286.7

[56] References Cited

U.S. PATENT DOCUMENTS 3,069,277  12/1962  Teja ........................................ 106/74
3,873,334  5/1975  Lee et al. ........................ 106/287.12

OTHER PUBLICATIONS

Advanced Inorganic Chemistry, Cotton F. A., p. 321, 1972.

Chem. Abstract, vol. 84: 110,638f.

*Primary Examiner*—Theodore Morris
*Attorney, Agent, or Firm*—Louis L. Dachs

[57] ABSTRACT

The invention is a compound for locking a fastener in place after it has been torqued and also for providing an indication that it has remained properly torqued. The compound includes 72.3% to 77.7% by weight of a first mixture of inorganic polysilicates. Preferably, the first mixture of inorganic polysilicates is substantially 51.7% $AlSiO_3$, 34.1% [$NaSiO_3$] $Na_2SiO_3$, and 13.2% $MgSiO_3$, all on a weight [bases] basis. Added to the first mixture is 2.3% to 2.7% by weight of a second mixture of substantially 80% $Al_2O_3$ fiber and 20% $SiO_2$ particles, all on a weight [bases] basis. Added to the first and second mixtures is 20% to 25% by weight $H_2O$. When used in an oxygen rich environment, 0.2% to 0.3% by weight of an inorganic pigment of a green color is added. The compound when mixed has a 45 minute pot life and cures at room temperature in four to six hours.

5 Claims, No Drawings

LOCKING COMPOUND FOR LOCKING FASTENERS IN PLACE

TECHNICAL FIELD

The invention relates to the field of systems for locking a torqued fastener in place and providing indication thereof and, particularly, to one suitable for use in an oxygen rich environment.

BACKGROUND INFORMATION

There are many methods available for locking a previously torqued fastener in place and, thereafter, for indicating whether the fastener has been tampered with or come loose. One common method is to lockwire the fastener; but lockwiring requires a hole in the fastener, as well as in the adjacent structure for the lockwire. The use of a castellated nut and cotter pin also accomplishes this dual function. But, here again, a special nut, a hole through the fastener and, of course, a cotter pin are required. Furthermore, cotter pins are not usable on fluid couplings.

When self-locking fasteners are used, an indicator in the form of a dab of paint across the fastener and adjacent structure is used. Tampering or self loosening is easy to spot because the paint will be broken at the line between the fastener and the adjacent structure typically between the nut and washer or bolt head and washer.

Unfortunately, most paints are made from organic compounds such as polyurethanes or epoxies. These cannot be used in oxygen rich environments, because a spark will easily ignite and burst them into flames. These paints also do not have the strength to act as a "lock".

Applicant has previously tested numerous, commercially available, ceramic cements but none have proven adequate. Only one ceramic material has proven usable (SCERMETAL), but it becomes brittle and separates from plumbing fittings upon aging. This material has also proved to be difficult to use.

Thus, it is a primary object of the subject invention to provide a fastener locking compound which provides a visual indication that the fastener has remained properly torqued.

It is another primary object of the subject invention to provide a fastener locking compound which is usable in an oxygen rich environment.

It is a further primary object of the subject invention to provide a fastener locking compound that provides good adhesion while not deteriorating with age.

It is still a further object of the subject invention to provide a fastener locking compound that is easy to prepare, has an adequate pot life, and is easy to apply.

DISCLOSURE OF THE INVENTION

The invention is a compound for locking a fastener in place after it has been torqued and also for providing an indication that it has remained properly torqued. The compound includes 72.3% to 77.7% by weight of a first mixture inorganic of polysilicates. Preferably, the first mixture of polysilicates is substantially 51.7% $AlSiO_3$, 34.1% $Na_2SiO_3$ and 13.2% $MgSiO_3$, all on a weight basis. Added to the first mixture is 2.3% to 2.7% by weight of a second mixture of substantially 80% $Al_2O_3$ fiber and 20% $SiO_2$ particles, all on a weight basis. The third constituent is 20% to 25% by weight $H_2O$. When used in an oxygen rich environment, 0.2% to 0.3% by weight of an inorganic pigment of a green color is added.

When the constituents are mixed into a paste, the compound has a 45 minute pot life and cures at room temperature in four to six hours. This time can be considerably decreased by raising the temperature. For example, the compound will cure in one to two minutes if heated to 600° to 625° F. by use of a heat gun.

The novel features which are believed to be characteristic of the invention, both as to its organization and method of operation, together with further objects and advantages thereof, will be better understood from the following description.

BEST MODE FOR CARRYING OUT THE INVENTION

The invention is a compound for locking a fastener in place after it has been torqued and also for providing an indication that it has remained properly torqued. The compound includes 77.3% to 77.7% by weight of a first mixture of inorganic polysilicates. Preferably, the first mixture of polysilicates is substantially 51.7% $AlSiO_3$ 34.1% $Na_2SiO_3$ and 13.2% $MgSiO_3$, all on a weight basis. A suitable, commercially available first mixture is DYLON manufactured by the Dylon Industries, Cleveland, Ohio. Added to the first mixture is 2.3% to 2.7% by weight of a second mixture of substantially 80% $Al_2O_3$ fiber and 20% $SiO_2$ particles, all on a weight basis. A suitable, commercially available, second mixture is thermal insulation (SALI) manufactured by Zircar Products, Inc., Florida, N.Y. The first and second mixtures should have a particle size of between 2.9 to 9.7 microns. Added to the first and second mixtures is 20% to 25% by weight $H_2O$, preferably deionized $H_2O$. When the compound is used in oxygen rich environments, 0.2% to 0.3% by weight of an inorganic green pigment is added. A suitable inorganic green pigment is No. F5203 manufactured by Ferro Corporation, Culver City, Calif. If the above, commercially available, first and second mixtures are used, they must be ground, preferably ball-milled, to meet the particle tolerance range (i.e., pass through a 60 to 200 mesh screen).

The compound is made by mixing the first and second combined mixtures and the pigment together and, thereafter, adding $H_2O$ to form a paste. Thus, it is normally stored in two-parts. When the water is added, it has a pot life of about three quarters of an hour and can be applied by use of a small brush, spatula, or comparable instrument. It typically cures in four to six hours at room temperature, but the cure time can be reduced to less than a few minutes if a heat gun is used to raise the temperature to 600° to 625° F.

TEST RESULTS

1. The compound has been successfully applied to stainless steel, both bare and clad aluminum, and titanium. It has been approved for use on these metals on military aircraft.

2. The compound has successfully passed compatibility tests per MIL-R-25410F for Oxygen Regulations, paragraphs 4.8.25 through 4.8.26 and has been certified for use in lox applications.

3. Samples have been subjected to MIL-H-27601A and MIL-H-6083, Petroleum Base Hydraulic Fluids, JP4, JP8, and JP7 fuels for 72 hours both at room temperature and 350° F. No degradation was observed after exposure.

4. The compound has been applied to hydraulic lines and vibrated on a paint shaker for over an hour. No visible cracks were observed.

5. Typical physical properties are: A) modulus of rupture 1393 PSI; B) compressive strength 4012 PSI; C) tensile strength 820 PSI.

While the invention has been described with reference to a particular embodiment, it should be understood that the embodiment is merely illustrative there are numerous variations and modifications which may be made by those skilled in the art. Thus, the invention is to be construed as being limited only by the spirit and scope of the appended claims.

INDUSTRIAL APPLICABILITY

The invention has application on fastener assembled structures of every type and, in particular, on structures exposed to high oxygen environments.

I claim:

1. A compound for locking a fastener in place and, thereafter, providing a visual indication that it has remained properly torqued comprising:
   72.3% to 77.7% by weight of a first mixture of inorganic polysilicates;
   2.3% to 2.7% of a second mixture substantially of 80% $Al_2O_3$ fiber and 20% $SiO_2$ particles on a weight basis; and,
   20% to 25% by weight $H_2O$.

2. The compound of claim 1 wherein said first mixture of inorganic polysilicates comprises substantially 51.7% $AlSiO_3$, 34.1% $Na_2SiO_3$, and 13.2% $MgSiO_3$, all on a weight basis.

3. The compound of claim 2 wherein said first and second mixtures have a particle size of between 2.9 to 9.7 microns.

4. The compound of claim 3 further including 0.2% to 0.3% by weight inorganic pigment.

5. The compound of claim 4 wherein said $H_2O$ is deionized.

* * * * *